(12) United States Patent
Miyagishima et al.

(10) Patent No.: US 9,247,112 B2
(45) Date of Patent: Jan. 26, 2016

(54) IMAGING DEVICE AND METHOD FOR DISPLAYING ELECTRONIC VIEWFINDER

(71) Applicant: FUJIFILM Corporation, Tokyo (JP)

(72) Inventors: Shunsuke Miyagishima, Saitama (JP); Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/479,669

(22) Filed: Sep. 8, 2014

(65) Prior Publication Data
US 2014/0375864 A1 Dec. 25, 2014

(30) Foreign Application Priority Data
Mar. 15, 2012 (JP) ................. 2012-059036

(51) Int. Cl.
| | | |
|---|---|---|
| H04N 5/217 | (2011.01) | |
| G03B 13/02 | (2006.01) | |
| H04N 5/232 | (2006.01) | |
| G03B 13/06 | (2006.01) | |

(Continued)

(52) U.S. Cl.
CPC .............. H04N 5/2173 (2013.01); G03B 13/02 (2013.01); G03B 13/06 (2013.01); H04N 5/23293 (2013.01); H04N 5/2251 (2013.01); H04N 5/3572 (2013.01)

(58) Field of Classification Search
CPC ............ H04N 5/2173; H04N 5/23293; H04N 5/3572; H04N 5/2251; G03B 13/02; G03B 13/06
USPC .......................... 348/335, 343, 344
See application file for complete search history.

(56) References Cited

U.S. PATENT DOCUMENTS

2009/0244351 A1* 10/2009 Takamatsu et al. ...... 348/333.01
2010/0003025 A1 1/2010 Oikawa
(Continued)

FOREIGN PATENT DOCUMENTS

JP 2006-262504 A 9/2006
JP 2010-16610 A 1/2010
(Continued)

OTHER PUBLICATIONS

International Search Report, issued in PCT/JP2013/053636, dated May 14, 2013.
(Continued)

Primary Examiner — Nhan T Tran
Assistant Examiner — Chan Nguyen
(74) Attorney, Agent, or Firm — Birch, Stewart, Kolasch & Birch, LLP

(57) ABSTRACT

An imaging device comprising: a first optical system formed by combining an optical system from an imaging lens to an image pickup element where a subject image is formed and an optical system from a display device where an electronic image of a subject representing an image formed at the image pickup element is displayed to an ocular unit of a finder; a second optical system which guides an optical image of the subject to the ocular unit; and a correcting device which performs, based on distortion aberration information about the first optical system and distortion aberration about the second optical system, distortion aberration correction so that distortion aberration equal to distortion aberration of the second optical system occurs in an electronic image of the subject and causes the electronic image to be displayed on the display device.

21 Claims, 10 Drawing Sheets

(51) Int. Cl.
*H04N 5/225* (2006.01)
*H04N 5/357* (2011.01)

(56) References Cited

U.S. PATENT DOCUMENTS

2011/0122233 A1* 5/2011 Kasai et al. .................. 348/49
2012/0105813 A1* 5/2012 Todoroki ..................... 353/69
2012/0113278 A1* 5/2012 Okada ........................ 348/208.4

FOREIGN PATENT DOCUMENTS

JP 2010-119029 A 5/2010
JP 2010-263538 A 11/2010

OTHER PUBLICATIONS

Written Opinion of the International Searching Authority, issued in PCT/JP2013/053636, dated May 14, 2013.

* cited by examiner

IMAGING DEVICE AND METHOD FOR DISPLAYING ELECTRONIC VIEWFINDER

CROSS-REFERENCE TO RELATED APPLICATIONS

This application is a Continuation of PCT International Application No. PCT/JP2013/053636 filed on Feb. 15, 2013, which claims priority under 35 U.S.C §119(a) to Japanese Patent Application No. 2012-59036 filed on Mar. 15, 2012. Each of the above application(s) is hereby expressly incorporated by reference, in its entirety, into the present application.

BACKGROUND OF THE INVENTION

1. Field of the Invention

The present invention relates to imaging devices and electronic viewfinder display methods and, in particular, to an imaging device and electronic viewfinder display method capable of switching between an electronic viewfinder and an optical viewfinder.

2. Description of the Related Art

In the technical field of digital cameras (imaging devices) so far, it is general that an electronic image of a subject obtained from an imaging lens an imaging optical system such as an image pickup element is displayed on a liquid-crystal monitor to check composition and a focus state. However, in recent years, models provided with a finder for checking composition and a focus state separately from a liquid-crystal monitor on a rear surface have been widespread. As these finder types, there are an optical viewfinder (OVF: Optical View Finder, hereinafter OVF) and an electronic viewfinder (EVF: Electronic View Finder, hereinafter EVF), which each have advantages and disadvantages.

Specifically, the OVF has some superiority over the EVF, such as "no response delay in display", "clear display image", and "composition can be easily determined since the outside of an imaging range can be viewed (depending on the type)". On the other hand, the EVF has superiorities in use over the OVF, such as "replayed image and menu display (including superimposing display) are possible". Therefore, in a digital camera (imaging device) including both an OVF and an EVF, it is preferable to switch between the OVF and the EVF as appropriate according to the situation.

Imaging devices including an electronic viewfinder are described in, for example, Japanese Patent Application Laid-Open No. 2010-16610 (hereinafter referrred to as PTL 1) and Japanese Patent Application Laid-Open No. 2010-119029 (hereinafter referrred to as PTL 2). PTL 1 discloses an imaging device including a finder device allowing simultaneous observation of a first display region and a second display region from an ocular window through an optical system, the first display region in which a subject image is observed as an optical image and the second display region in which an electronic image obtained by photoelectric conversion by the image pickup element and displayed by a display device is observed; and the imaging device also including a display control device which distorts the electronic image in advance by image processing so that luminous distortion occurring due to passage through the optical system when observed from the ocular window is cancelled out for display on the display device.

With this, while observation of an optical image of a substance is kept possible without taking eyes off the finder, the state of an image taken, the state of settings of the camera, and imaging auxiliary information can be checked with the electronic image. Furthermore, since the electronic image is subjected to image processing in advance so that distortion occurring due to passage through the finder optical system is inconspicuous, the electronic image to be observed becomes a favorable image with distortion cancelled out.

Furthermore, PTL 2 discloses an imaging device including an imaging device which images a subject via an imaging optical system and outputs an image signal, an image processing device which generates image data based on the image signal, a first display device which displays an image based on the image data, and a visual recognition optical system allowing visual recognition of the image, wherein the image processing device generates image data so as to correct optical aberration of the visual recognition optical system.

With this, an imaging device can be provided capable of electrically correcting optical aberration such as magnification chromatic aberration and distortion aberration due to a loupe lens of an electronic-type viewfinder and allowing observation of a subject image without color bleeding, distortion and so on.

SUMMARY OF THE INVENTION

However, since both of the imaging devices disclosed in PTL 1 and PTL 2 correct the electronic image displayed on the electronic viewfinder so that distortion aberration is eliminated, when switching is made between an OVF image and an EVF image, a user (observer) disadvantageously feels discomfort due to a difference between distortion aberration of the OVF image and distortion aberration of the EVF image.

In view of these circumstances, an imaging device and electronic viewfinder display method preventing a user from feeling discomfort even if switching is made between an OVF image and an EVF image.

The problems of the present invention can be solved by each invention described below.

That is, an imaging device of the present invention includes a first optical system formed by combining an optical system from an imaging lens to an image pickup element where a subject image is formed and an optical system from a display device where an electronic image of a subject representing an image formed at the image pickup element is displayed to an ocular unit of a finder, a second optical system which guides an optical image of the subject to the ocular unit, and a correcting device which performs, based on distortion aberration information about the first optical system and distortion aberration about the second optical system, distortion aberration correction so that distortion aberration equal to distortion aberration of the second optical system occurs in an electronic image of the subject and causes the electronic image to be displayed on the display device.

With this, even if switching is made between an optical image and an electronic image, both images have the same distortion aberration, and therefore discomfort is prevented.

Also, in the imaging device of the present invention, the correcting device calculates an absolute value α of a difference between the distortion aberration about the first optical system and the distortion aberration about the second optical system, and does not perform the distortion aberration correction when α is equal to a threshold set in advance or less and performs the distortion aberration correction when α is larger than the threshold.

With this, in the case of distortion aberration to a degree of no discomfort even without distortion aberration correction, distortion aberration correction is not performed. Therefore, resources such as a CPU are not consumed, power consumption can be reduced, and the battery life can be extended.

Furthermore, in the imaging device of the present invention, the imaging lens is replaceable, the device further comprises a distortion aberration information obtaining device which obtains distortion aberration information about at least one of the first optical system and the second optical system, and the distortion aberration information obtaining device obtains the distortion aberration information about at least one of the first optical system and the second optical system from a storage device provided to the imaging lens or the storage device provided to a body of the imaging device or outside the body of the imaging device via wired or wireless communication.

With this, distortion aberration information can be obtained from various places. For example, when obtained from outside of the imaging device body, the latest distortion aberration information can be always obtained.

Still further, the imaging device of the present invention further includes a distortion aberration information obtaining device which obtains distortion aberration information about at least one of the first optical system and the second optical system, in the first optical system, with the lens replaced or with lens zooming done, the distortion aberration information obtaining device re-obtains distortion aberration information about the first optical system and, in the second optical system, with the lens added or removed or with lens zooming done, the distortion aberration information obtaining device re-obtains distortion aberration information about the second optical system, and the correcting device performs the distortion aberration correction based on the re-obtained distortion aberration information.

With this, when distortion aberration of the optical system is changed, information about the changed distortion aberration is re-obtained. Therefore, distortion aberration of the second optical system and distortion aberration of the first optical system can be always equalized.

Still further, in the imaging device of the present invention, the correcting device performs the distortion aberration correction, with a mode of displaying the optical image from the second optical system on the ocular unit being switched to a mode of displaying the electronic image from the first optical system.

Still further, in the imaging device of the present invention, the correcting device does not perform the distortion aberration correction in a state of a fixed mode where a mode of displaying the electronic image from the first optical system on the ocular unit is not switched to a mode of displaying the optical image from the second optical system, and performs the distortion aberration correction with the fixed mode released.

With this, in the case of a fixed mode in which the observer does not feel discomfort because switching between the electronic image and the optical image is not performed, distortion aberration correction is not performed. Therefore, resources such as a CPU are not consumed, power consumption can be reduced, and the battery life can be extended.

Still further, in the imaging device of the present invention, the correcting device does not perform the distortion aberration correction in a state of not being in a superimposing display mode where the electronic image from the first optical system and the optical image from the second optical system are displayed in a superimposing manner on the ocular unit, and performs the distortion aberration correction in the superimposing display mode.

With this, since distortion aberration of the electronic image and distortion aberration of the optical image coincide with each other in superimposing display, discomfort is prevented at the time of superimposing display. Also, when superimposing display is not performed, distortion aberration correction is not performed. Therefore, resources such as a CPU are not consumed, power consumption can be reduced, and the battery life can be extended.

Still further, in an electronic viewfinder display method of the present invention, based on distortion aberration information about a first optical system formed by combining an optical system from an imaging lens to an image pickup element where a subject image is formed and an optical system from a display device where an electronic image of a subject representing an image formed at the image pickup element is displayed to an ocular unit of a finder, and distortion aberration information about a second optical system which guides an optical image of the subject to the ocular unit, distortion aberration correction is performed on the electronic image so that distortion aberration equal to distortion aberration occurring in the second optical system and causing the electronic image to be displayed on the display device.

Even if switching is made between an OVF image and an EVF image, discomfort due to a difference in distortion aberration can be prevented.

DETAILED DESCRIPTION OF THE PREFERRED EMBODIMENTS

Figure 1:
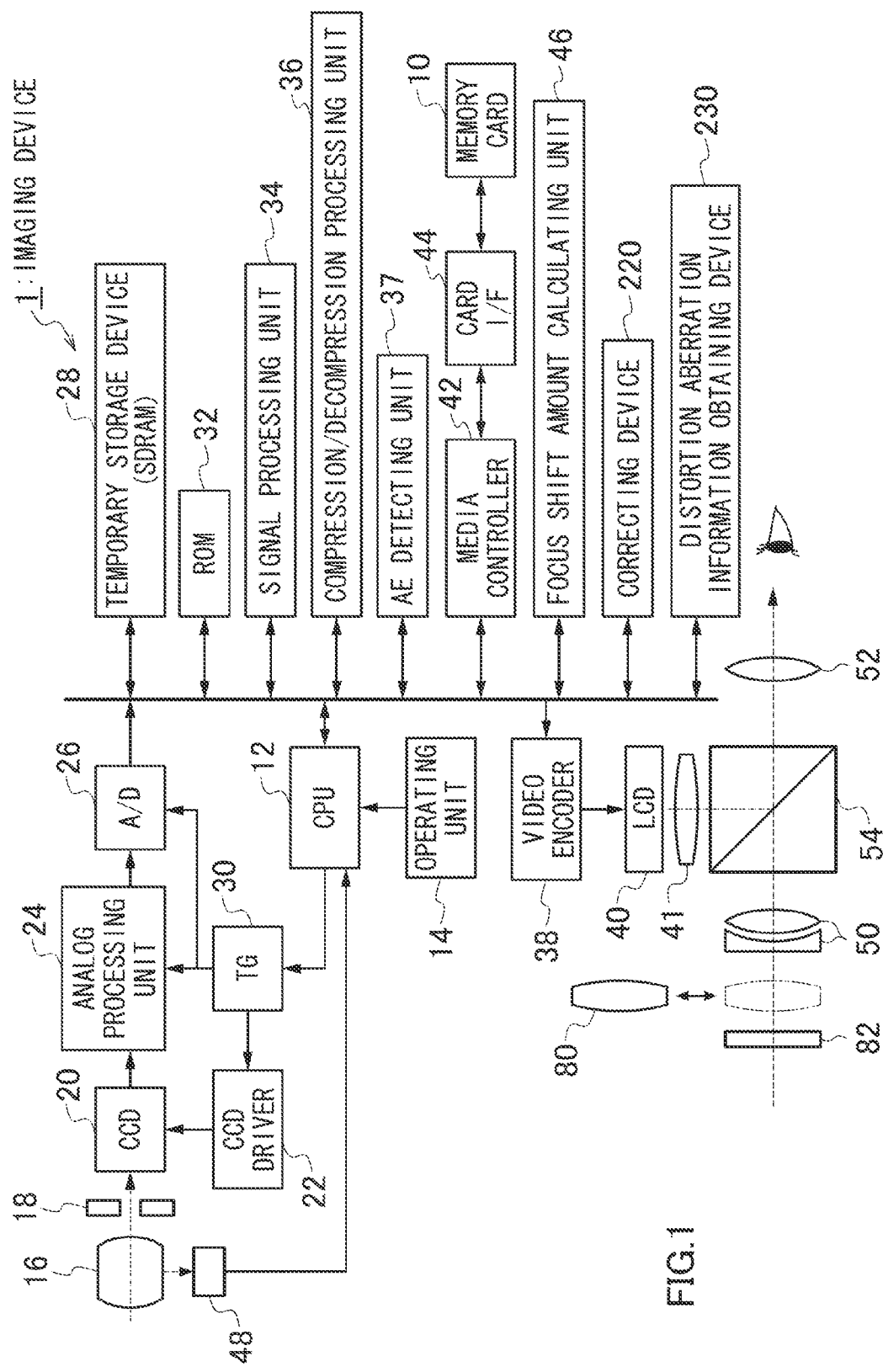
FIG. 1 is a block diagram depicting an embodiment of an imaging device according to the present invention.

Embodiments for carrying out the present invention are described in detail below with reference to the attached drawings. Here, in the drawings, portions denoted by the same reference symbol are similar elements with a similar function.

<Entire Structure of Imaging Device>

An entire structure of an imaging device according to the present invention is described with reference to the drawings. FIG. 1 is a block diagram depicting an embodiment of the imaging device according to the present invention.

As depicted in FIG. 1, the imaging device 1 is a digital camera which records imaged still pictures and moving pictures in a memory card 10, and the operation of the entire camera operation is controlled by a central processing unit (CPU) 12 in a centralized manner.

An operating unit 14 of the imaging device 1 includes a power supply switch; a shutter button; a mode switching switch for switching among an optical finder mode, an electronic viewfinder mode, an optical-electronic superimposing finder mode, a macro mode, a still picture imaging mode, a moving picture imaging mode, a replay mode, an automatic focus adjustment (AF mode), a manual focus adjustment (MF mode), and so on; a multifunction cross key for outputting various instruction signals such as zooming and frame advancing; and others. Various operation signals from this operating unit 14 are applied to the CPU 12.

When an imaging mode is set, an image of image light representing a subject is formed via an imaging optical system 16 including a focus lens movable by a manual operation and an imaging lens and an iris 18 onto a light receiving surface of an image pickup element (CCD) 20. Signal charges accumulated in the CCD 20 are sequentially read with transfer pulses applied from a CCD driver 22 as voltage signals according to the signal charges. Note that the CCD 20 has a so-called electronic shutter function of controlling charge accumulation time (shutter speed) of each photosensor with timing of a shutter gate pulse.

These voltage signals sequentially read from the CCD 20 are applied to an analog processing unit 24. The analog processing unit 24 includes signal processing circuits such as a sampling hold circuit, a color separation circuit, and a gain adjustment circuit. With correlated double sampling (CDS) processing and color separation processing into R, G, and B color signals, the signal level of each color signal is adjusted (pre-white balance processing) is performed. A signal outputted from the analog processing unit 24 is converted by an A/D converter 26 to a digital signal (hereinafter referred to as a "CCDRAW data"), and then is stored in a temporary storage device 28 such as an SDRAM.

The temporary storage device 28 has a storage capacity capable of temporarily storing CCDRAW data for a plurality of frames. Note that the storage capacity of the temporary storage device 28 is not restricted thereto. Also, a timing generator (TG) 30 provides a timing signal to the CCD driver 22, the analog processing unit 24, and the A/D converter 26 by following an instruction from the CPU 12. With this timing signal, the respective circuits are synchronized with each other.

In a ROM 32, programs, adjustment values, and so on are stored in advance, and these programs and adjustment values are read as appropriate.

A signal processing unit 34 has a WB gain unit which performs white balance (WB) correction by adjusting gains of R, G, and B signals; a gamma correction unit which performs gamma correction according to a ROM table where a predetermined gamma characteristic is stored for each of the WB-corrected R, G, and B signals; a color interpolation processing unit which performs color interpolation processing correspondingly to a color filter arrangement of the CCD 20; a YC processing unit performs processing of generating luminance data Y and color difference data Cr and Cb (YC conversion); an edge enhancing unit which performs edge enhancement by applying an aperture signal to the luminance data Y; a noise reduction processing unit which performs noise reduction processing such as smoothing processing and median filter processing; and a chroma enhancing unit which increasing or decreasing gains of the color difference data Cr and Cb. The CCDRAW data stored in the temporary storage device 28 is sequentially subjected to signal processing at the respective processing units.

The image data processed at the signal processing unit 34 is encoded at a video encoder 38, and is outputted to a small-sized liquid-crystal display unit (LCD) 40, which is a display device. With this, a subject image is displayed on a display screen of the LCD 40.

Note that in an imaging preparation stage, images continuously taken by the CCD 20 at predetermined intervals are subjected to processing for image display, and then are outputted to the LCD 40 and displayed as a live view image (a through-the-lens image).

On the other hand, when the shutter button is fully pressed, imaging is performed via the imaging optical system 16 and the CCD 20, and the CCDRAW data stored in the temporary storage device 28 is subjected to various signal processing at the signal processing unit 34 and is then converted to YC data. Then, the YC data is outputted to a compression/decompression processing unit 36, where predetermined compression processing such as JPEG (Joint Photographic Experts Group) is performed. The compressed data subjected to compression processing is recorded via a media controller 42 and a card interface 44 in the memory card 10.

An automatic exposure (AE) detecting unit 37 integrates G signals of the entire image or integrates G signals weighted differently for an image center part and a peripheral part, and outputs the integrated value to the CPU 12. The CPU 12 calculates brightness of the subject (imaging Ev value) from the integrated value inputted from the AE detecting unit 37, determines an F value of the iris 18 and an electronic shutter (shutter speed) of the CCD 20 based on this imaging Ev value according to a predetermined program linear diagram, and controls the iris 18 based on the determined F value. Also, based on the determined shutter speed, the CPU 12 controls the charge accumulation time at the CCD 20 via the CCD driver 22.

Also, a focus shift amount calculating unit 46 detects a phase difference between parallax images in a predetermined focus area among parallax images obtained from phase-difference picture elements of the CCD 20 including the phase-difference picture elements, and finds a focus shift amount (defocus amount) based on information indicating this phase difference. Note that a focus shift amount may be detected based on an output signal from any of known phase-difference sensors including a separator lens and a sensor for detecting an image forming position of two images obtained by separation by the separator lens, in place of the CCD 20 including phase-difference picture elements.

The focus shift amount calculated by this focus shift amount calculating unit 46 can be used to control the focus lens of the imaging optical system 16 so that the focus shift amount is 0 in the AF mode, and is also used for display control of the through-the-lens image on the LCD 40 in the MF mode, which will be described further below.

Also, the focus lens position of the imaging optical system 16 is detected by a position sensor 48, and is sent to the CPU 12. Based on the detection output of the position sensor 48, the CPU 12 finds a distance of the subject in focus from a current position of the focus lens. Note that positions of the focus lens and subject distances corresponding to that position are stored in advance in the ROM 32 or the like. From this ROM 32, the CPU 12 reads a subject distance corresponding to the position of the focus lens. Also, the subject distance may be measured by a base-length triangulation sensor or the like. Thus measured subject distance can be used to control the focus lens of the imaging optical system 16 at the time of AF mode, and is used for display control of the through-the-lens image on the LCD 40 at the time of MF mode, which will be described further below. The above-described position sensor 48 also detects a position (zoom position) of a variable power lens of the imaging optical system 16, and outputs information about the zoom position to the CPU 12.

Furthermore, the imaging device 1 includes an optical finder (OVF) having an objective lens 50, an ocular lens 52, a finder variable power lens 80, and a liquid-crystal shutter 82. This liquid-crystal shutter 82 is controlled by the CPU 12, and becomes in a transparent state when the optical finder is used. With this, an optical image of the subject is transmitted through the liquid-crystal shutter 82, and can be observed with the ocular lens 52 through the objective lens 50.

Between the liquid-crystal shutter 82 and the objective lens 50, the finder variable power lens 80 is provided so as to be able to be inserted manually or upon instruction from the CPU 12. With the finder variable power lens 80 inserted between the liquid-crystal shutter 82 and the objective lens 50, an optical image enlarged by the finder variable power lens 80 can be observed from the ocular lens 52. Here, in place of or simultaneously with the finder variable power lens 80, any of other lenses having various characteristics can be provided so as to be able to be inserted. With this, an optical image with the characteristic of the lens reflected thereon can be observed from the ocular lens 52.

Also, information about whether the finder variable power lens 80 has been inserted between the liquid-crystal shutter 82 and the objective lens 50 is detected by a sensor (not depicted) provided near the finder variable power lens 80, and is transmitted to the CPU 12. With this, the CPU 12 can perform various controls according to the presence or absence of the finder variable power lens 80.

Between the objective lens 50 and the ocular lens 52, a beam splitter 54 is provided. This beam splitter 54 is used as a device which combines an optical image of the subject entering the objective lens 50 and the through-the-lens image displayed on the LCD 40 together. That is, the optical image entering the objective lens 50 is transmitted through the beam splitter 54 and can be observed with the ocular lens 52, and the through-the-lens image displayed on the LCD 40 is reflected by the beam splitter 54 at the right angle and can be observed with the ocular lens 52.

The above-described LCD 40, beam splitter 54, and ocular lens 52 configure an electronic viewfinder (EVF) allowing the through-the-lens image to be observed. Here, by setting the liquid-crystal shutter 82 in a light-shielding state, only the image from the LCD 40 can be observed from the ocular lens 52. Also, by setting the liquid-crystal shutter 82 in a transmitting state, superimposing display of the through-the-lens image on the LCD 40 and the optical image transmitted through the objective lens 50 can be made.

That is, this imaging device 1 includes a hybrid finder allowing OVF optical image display, EVF image display, and superimposing display of OVF and EVF images.

Since the optical axis of the imaging optical system 16 and the optical axis of the OVF are different from each other, parallax occurs between the optical image and the through-the-lens image in a predetermined focus area depending on the distance of the subject in that focus area. The CPU 12 causes movement of the display position of the through-the-lens image to be displayed on the LCD 40 so as to correct parallax occurring depending on the found subject distance described above. With this, display can be made so that the optical image and the through-the-lens image in the focus area coincide with each other.

First Embodiment

Figure 2:
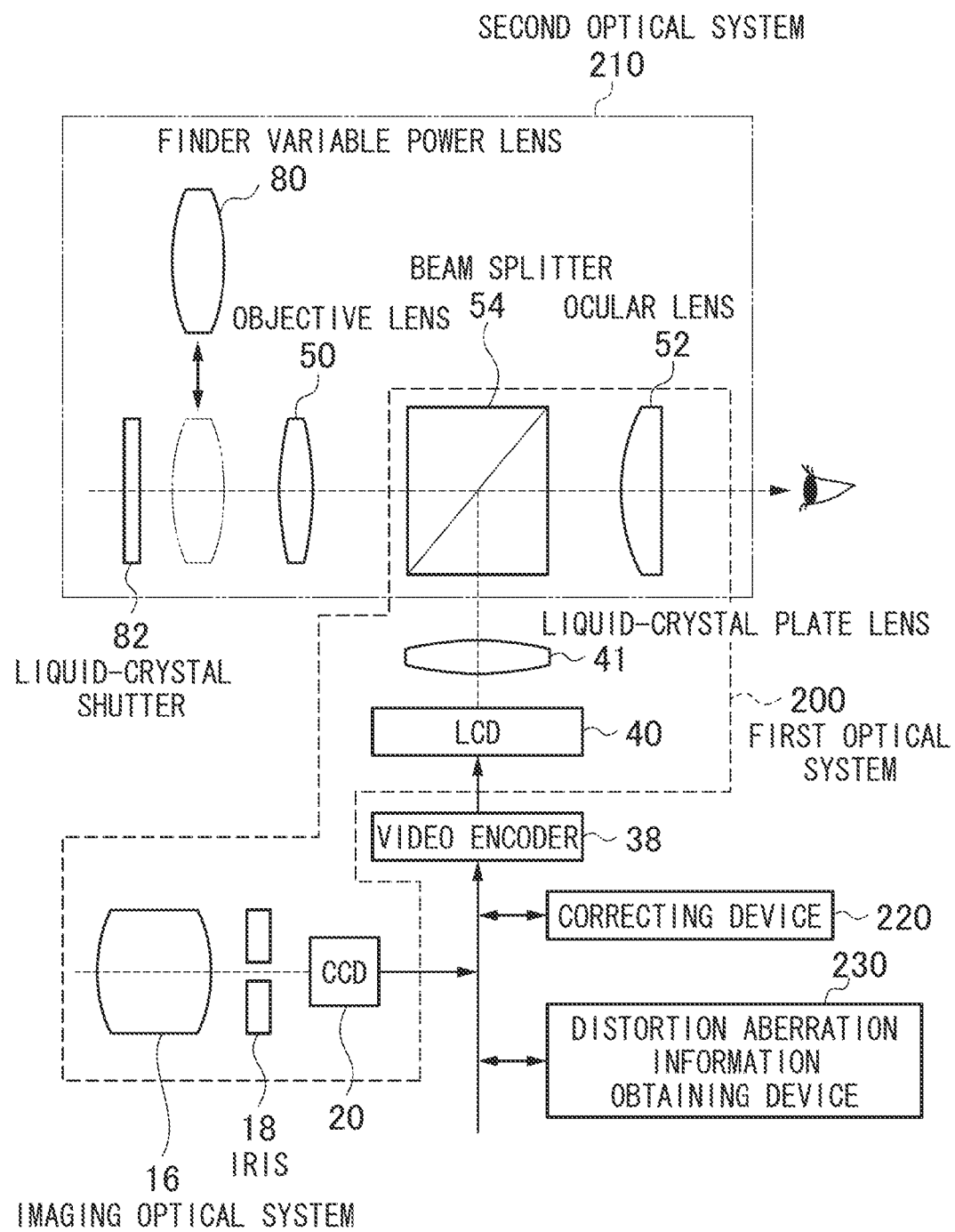
FIG. 2 is a block diagram for describing signal processing with OVF and EVF optical systems.

A first embodiment of the present invention is described with reference to the drawings. FIG. 2 is a block diagram for describing signal processing with OVF and EVF optical systems.

As depicted in FIG. 2, an imaging device according to the present invention is configured to mainly include a first optical system (EVF optical system) 200, a second optical system (OVF optical system) 210, and a correcting device 220. The first optical system 200 is configured of an optical system from the imaging optical system 16 including the imaging lens to the CCD 20, which is an image pickup element, and an optical system from the LCD 40, which is a display device where an electronic image of a subject representing an image formed at the CCD 20 is displayed, to the ocular lens 52, which is an ocular unit of a finder.

The first optical system 200 can include the imaging optical system 16, the iris 18, the CCD 20, the LCD 40, the liquid-crystal plate lens 41, the beam splitter 54, and the ocular lens 52. In the first optical system 200, electronic data of a subject image passing through the imaging optical system 16 and formed at the CCD 20 is electronically corrected by the correcting device 220, is encoded by the video encoder 38, and is then displayed on the LCD 40. The subject image displayed on the LCD 40 passes through the liquid-crystal plate lens 41 to be bent at the right angle by the beam splitter 54, and then reaches the ocular lens 52.

The second optical system 210 is an optical system for guiding the optical image of the subject image to the ocular lens 52, which is an ocular unit, and includes the liquid-crystal shutter 82, the finder variable power lens 80, the objective lens 50, the beam splitter 54, and the ocular lens 52. In the second optical system, the optical image of the subject passing through the liquid-crystal shutter 82 passes through the finder variable power lens 80 and the beam splitter 54 to reach the ocular lens 52.

Here, the optical components described in the first optical system 200 and the second optical system 210 are by way of example, and the optical systems can be configured by appropriately combining various optical components depending on how optical systems are assembled. While the optical system from the subject to the CCD 20 and the optical system without an optical component in common to the second optical system are described as an example in FIG. 2, for example, as a single-lens reflex lens, the optical system from the subject to the CCD 20 and an optical system with a portion in common to the second optical system are also in the scope of the invention of the present application.

That is, as described above, the first optical system refers to an optical system configured of an optical system from an imaging lens to an image pickup element and an optical system from a display device where an electronic image of a subject representing an image formed at the image pickup element is displayed to an ocular unit of a finder. Also, the second optical system refers to an optical system which guides an optical image of the subject to the ocular unit.

Based on distortion aberration (distortion) information about the first optical system (EVF optical system) 200 and distortion aberration information about the second optical system (OVF optical system) 210, the correcting device 220 corrects the electronic image of the subject obtained at the CCD 20 so that distortion aberration similar to distortion aberration occurring at the OVF optical system 210 occurs, and causes the image to be displayed on the LCD 40.

With this, even when the OVF optical system is switched to the EVF optical system (that is, the OVF is switched to the EVF) for observation, the EVF image with distortion aberration similar to that of the OVF image can be observed, and therefore the observer does not feel discomfort.

Figure 3:
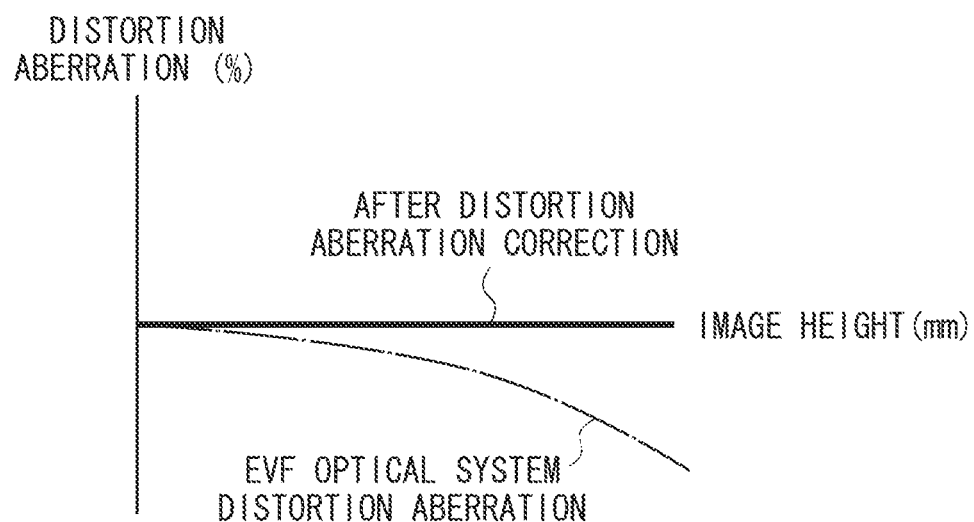
FIG. 3 is a graph depicting conventional distortion aberration correction.
Figure 4:
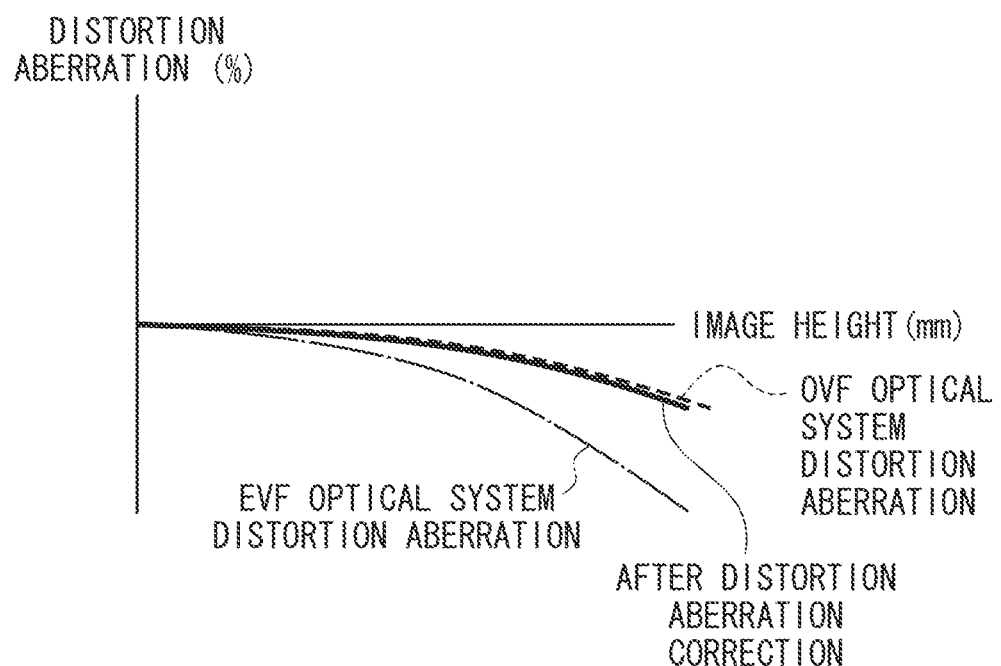
FIG. 4 is a graph depicting distortion aberration correction of the present invention.

This distortion aberration correction is further described with reference to the drawings. FIG. 3 is a graph depicting conventional distortion aberration correction, and FIG. 4 is a graph depicting distortion aberration correction of the present invention. In both FIG. 3 and FIG. 4, the horizontal axis represents image height in units of [mm], and the vertical axis represents distortion ratio. The distortion ratio represents a ratio at which the image is distorted with each image height when the optical axis is taken as the origin.

As depicted in FIG. 3, lens DST (lens distortion aberration (distortion)] is conventionally corrected so that distortion aberration is eliminated. With this, the observer can view an image without distortion aberration. However, when the OVF is switched to the EVF, an OVF image where distortion aberration is present is switched to an EVF image where distortion aberration is removed by correction, and therefore the observer feels discomfort.

Thus, in the present invention, as depicted in FIG. 4, the electronic image of the subject is corrected so that DST [distortion aberration (distortion)] of the EVF optical system matches distortion aberration of the OVF optical system, that is, distortion similar to distortion occurring in the OVF optical system occurs. With this, even if the OVF is switched to the EVF, image distortion is the same, and therefore the observer does not feel discomfort.

Figure 11:
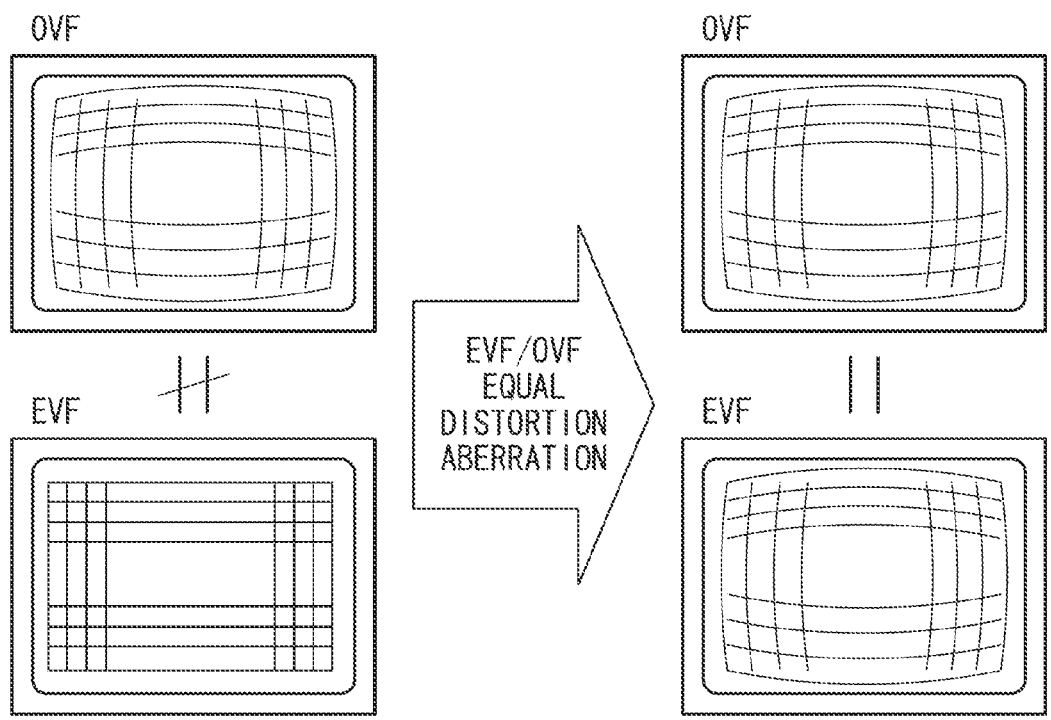
FIG. 11 is a descriptive diagram representing OVF and EVF distortion aberration as images.

That is, as depicted in FIG. 11 (FIG. 11 is a descriptive diagram representing OVF and EVF distortion aberration as images), conventionally, since distortion aberration of the OVF image and distortion aberration of the EVF image are different from each other (a drawing on the left in FIG. 11), the observer feels discomfort when the OVF image is switched to the EVF image.

However, in the present invention, as depicted in a drawing on the right in FIG. 11, correction is made so that distortion aberration of the EVF image is equal to distortion aberration of the OVF image, and therefore the observer does not feel discomfort even if the OVF image is switched to the EVF image. FIG. 11 represents an example of images of distortion aberration of the OVF image and distortion aberration of the EVF image, and the present invention is not meant to be restricted to these distortion aberrations.

With reference to FIG. 1, here, distortion aberration information is obtained by a distortion aberration information obtaining device 230. The distortion aberration information obtaining device 230 may obtain distortion aberration information from the temporary storage device 28, or may obtain distortion aberration information from the ROM 32. Alternatively, the distortion aberration information obtaining device 230 may obtain distortion aberration information from, for example, a storage device provided to the imaging lens of the imaging optical system 16. Furthermore, the distortion aberration information obtaining device 230 may include a wireless or wired communication device and, by using this communication device, obtain distortion aberration information from outside of an imaging device body, for example, via the Internet or WiFi or the like.

Second Embodiment

Next, a second embodiment of the present invention is described with reference to the drawings. The second embodiment of the present invention is mostly common to the first embodiment, and therefore description of common portions is omitted, and only different portions are described.

Figure 5:
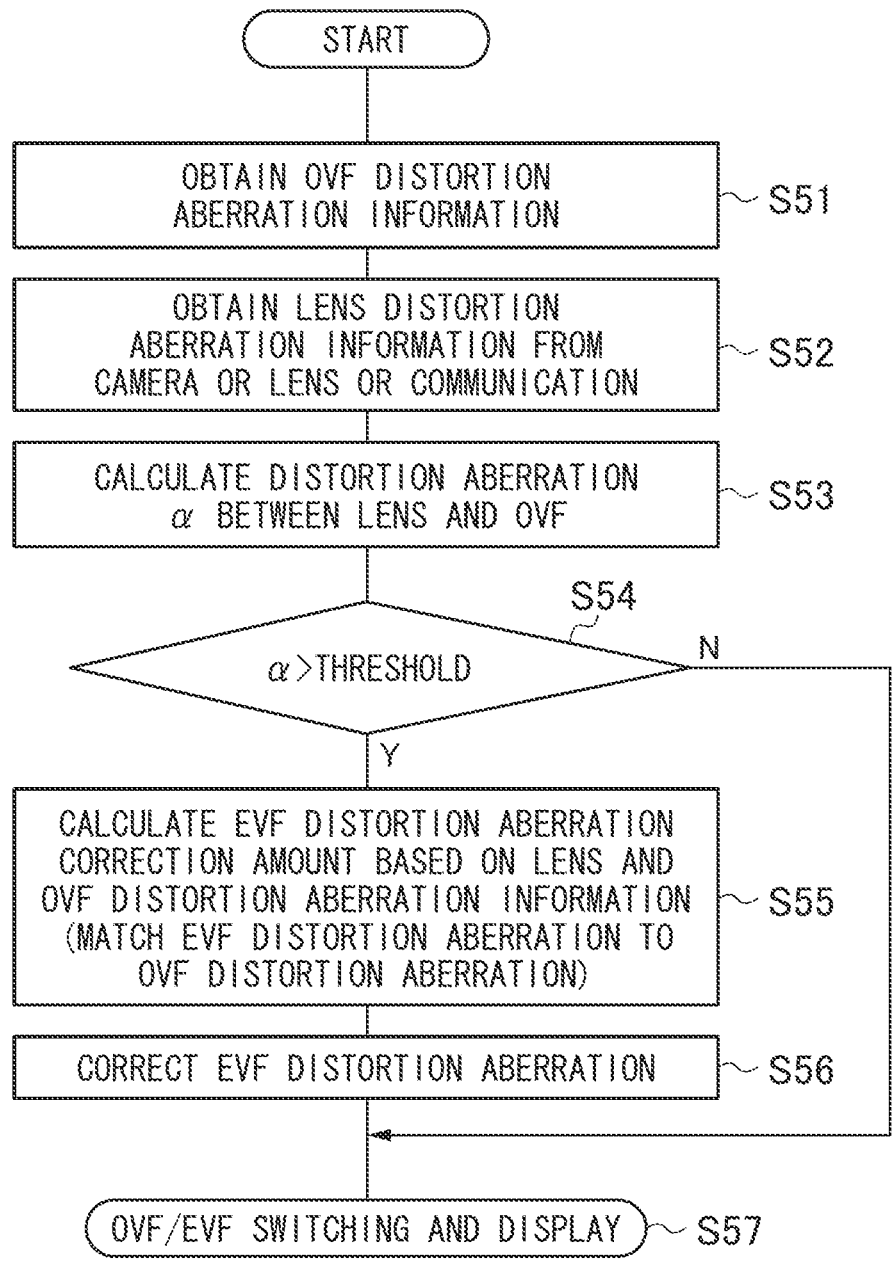
FIG. 5 is a flow diagram depicting an operation of a second embodiment.

Description is made with reference to FIG. 5. FIG. 5 is a flow diagram depicting an operation of the second embodiment. As depicted in FIG. 5, the distortion aberration information obtaining device 230 obtains a value of distortion aberration of the OVF (S51). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S52).

Next, the correcting device 220 calculates an absolute value α of a difference between EVF distortion aberration and OVF distortion aberration obtained from the distortion aberration information obtaining device 230 (S53). The correcting device 220 determines whether the calculated a is larger than a threshold set in advance or not (S54). As a result, when it is determined that a is larger than the threshold, the next step S55 is performed. When it is determined that a is not larger than the threshold, the OVF is switched to the EVF for display, without performing correction (S57).

Here, comparison between a and the threshold may be performed by the correcting device, the CPU, or another portion. The correcting device 220 may be considered as including a portion which compares between a and the threshold.

At step S55, based on the distortion aberration information about the lens of the EVF optical system and the OVF, the correcting device 220 calculates a distortion aberration correction amount of the EVF so that distortion of the EVF image is equal to distortion of the OVF image (S55). Based on the calculated correction amount, the correcting device 220 performs EVF distortion aberration correction (S56), and causes the corrected image to be displayed on the LCD 40. Also, the CPU 12 causes the liquid-crystal shutter 82 to be in a non-transparent state and guides only the EVF image to the ocular lens 52 (S57).

As such, in the second embodiment of the present invention, the correcting device 220 calculates the absolute value α of the difference between distortion aberration regarding the EVF optical system and distortion aberration regarding the OVF optical system, and performs correction so that distortion aberration of the image of the EVF matches distortion aberration of the OVF image only when α is larger than the predetermined threshold. With this, correction is not performed when the difference in distortion aberration between the EVF and the OVF is not much, that is, when the observer does not feel discomfort too much when the OVF is switched to the EVF even without performing correction. Therefore, load on the electronic circuits such as the correcting device 220 and the CPU 12 can be reduced, power consumption is suppressed, and battery life can be improved.

Third Embodiment

Next, a third embodiment of the present invention is described with reference to the drawings. The third embodiment of the present invention is mostly common to the first embodiment, and therefore description of common portions is omitted, and only different portions are described.

Figure 6:
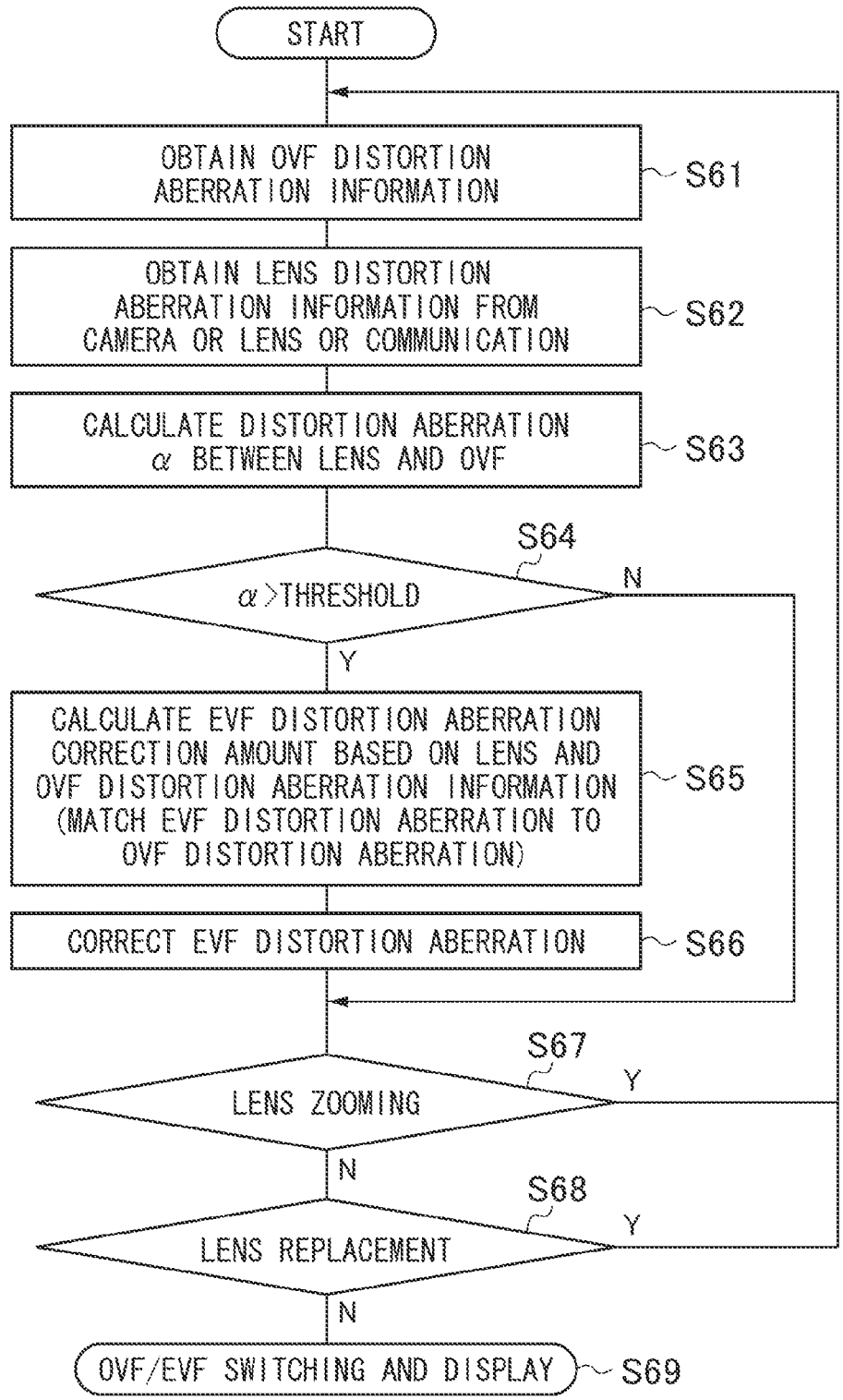
FIG. 6 is a flow diagram depicting an operation of a third embodiment.

Description is made with reference to FIG. 6. FIG. 6 is a flow diagram depicting an operation of the third embodiment. As depicted in FIG. 6, the distortion aberration information obtaining device 230 obtains a value of distortion aberration of the OVF (S61). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S62).

Next, the correcting device 220 calculates an absolute value α of a difference between EVF distortion aberration and OVF distortion aberration obtained from the distortion aberration information obtaining device 230 (S63). The correcting device 220 determines whether the calculated a is larger than a threshold set in advance or not (S64). As a result, when it is determined that a is larger than the threshold, the next step S65 is performed. When it is determined that a is not larger than the threshold, the OVF is switched to the EVF for display, without performing correction (S69).

Here, comparison between a and the threshold may be performed by the correcting device, the CPU, or another portion. The correcting device 220 may be considered as including a portion which compares between a and the threshold.

At step S65, based on the distortion aberration information about the lens of the EVF optical system and the OVF, the correcting device 220 calculates a distortion aberration correction amount of the EVF so that distortion of the EVF image is equal to distortion of the OVF image (S65). Based on the calculated correction amount, the correcting device 220 performs EVF distortion aberration correction (S66).

The distortion aberration information obtaining device 230 determines whether zooming has been performed for the lens of the imaging optical system 16. When it is determined that zooming has been performed, the procedure returns to step S61 for execution therefrom. When it is not determined that zooming has been performed, step S68 is performed next.

Here, a determination whether zooming has been performed can be made based on information from the CPU 12 by determining whether the zoom lens of the imaging optical system 16 is controlled by the CPU 12 to perform a zooming operation. Also, a determination may be made based on a signal from a sensor provided to the zoom lens and capable of detecting whether zooming has been performed. In addition, a determination can be made based on general techniques usable for determining whether zooming has been performed The distortion aberration information obtaining device 230 determines whether the lens configuring the imaging optical system 16 has been replaced. When it is determined that the lens has been replaced, the procedure returns to step S61 for execution therefrom. When it is not determined that the lens has been replaced, step S69 is performed next.

As step S69, the correcting device 220 causes the image to be displayed on the LCD 40, and the CPU 12 causes the liquid-crystal shutter 82 to be in a non-transparent state and guides only the EVF image to the ocular lens 52 (S69).

As such, in the third embodiment of the present invention, when an event causing a change in distortion aberration of the EVF optical system occurs, the distortion aberration information obtaining device 230 re-obtains distortion aberration information after the change. Therefore, according to the change in distortion aberration, the EVF image with the same distortion aberration as that of the OVF image can always be displayed. Thus, while lens zooming and lens replacement are exemplarily stated as events which change the distortion aberration information about the EVF optical system in FIG. 6, this is not meant to be restrictive, and all events which change the distortion aberration information about the EVF optical system are included in the scope of the invention of the present application.

Fourth Embodiment

Next, a fourth embodiment of the present invention is described with reference to the drawings. The fourth embodiment of the present invention is mostly common to the first embodiment, and therefore description of common portions is omitted, and only different portions are described.

Figure 7:
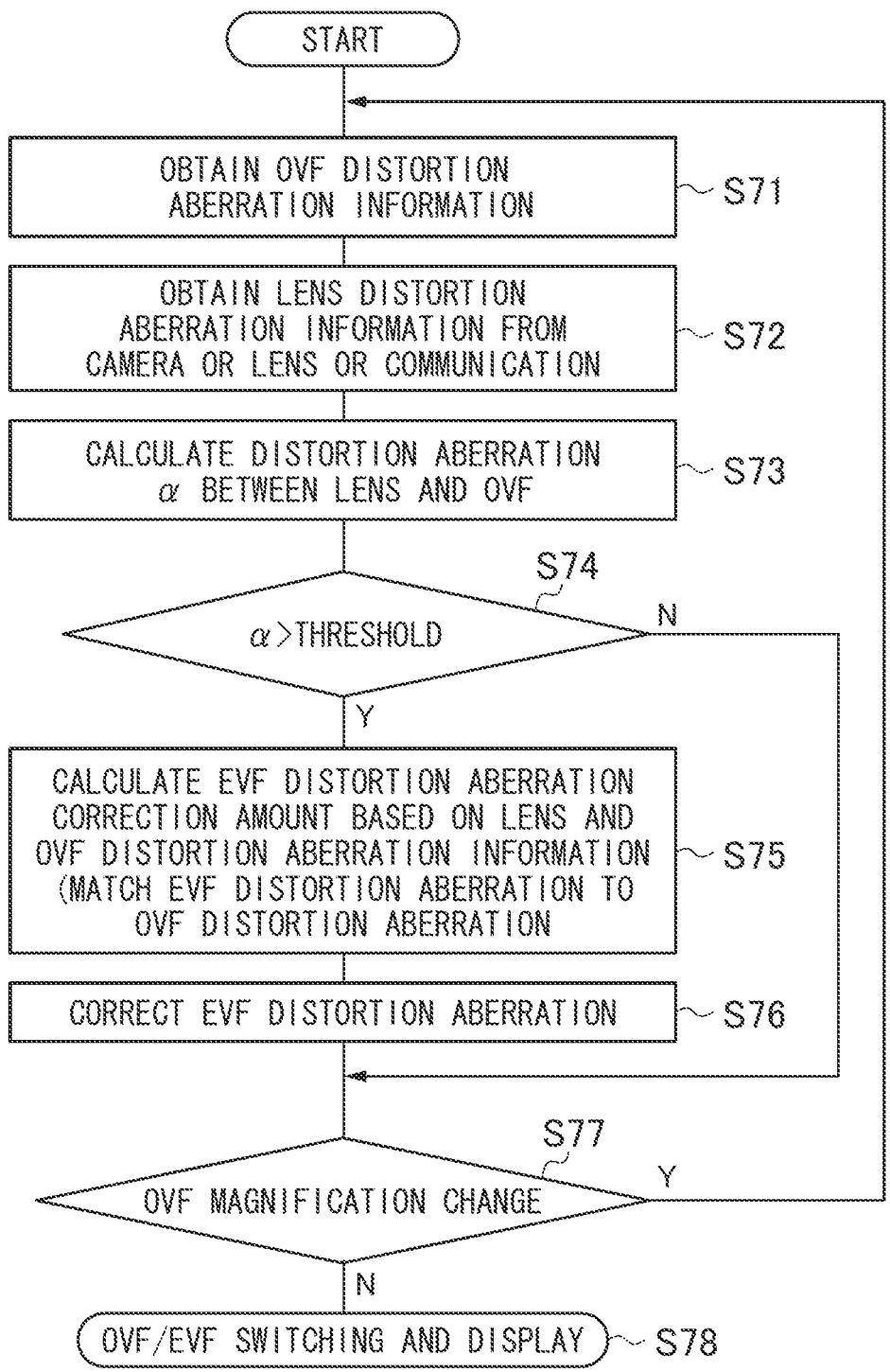
FIG. 7 is a flow diagram depicting an operation of a fourth embodiment.

Description is made with reference to FIG. 7. FIG. 7 is a flow diagram depicting an operation of the fourth embodiment. As depicted in FIG. 7, the distortion aberration information obtaining device 230 obtains a value of distortion aberration of the OVF (S71). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S72).

Next, the correcting device 220 calculates an absolute value α of a difference between EVF distortion aberration and OVF distortion aberration obtained from the distortion aberration information obtaining device 230 (S73). The correcting device 220 determines whether the calculated a is larger than a threshold set in advance or not (S74). As a result, when it is determined that a is larger than the threshold, the next step S75 is performed. When it is determined that a is not larger than the threshold, step S77 is performed without performing correction.

Here, comparison between a and the threshold may be performed by the correcting device, the CPU, or another portion. The correcting device 220 may be considered as including a portion which compares between a and the threshold.

At step S75, based on the distortion aberration information about the lens of the EVF optical system and the OVF, the correcting device 220 calculates a distortion aberration correction amount of the EVF so that distortion of the EVF image is equal to distortion of the OVF image (S75). Based on the calculated correction amount, the correcting device 220 performs EVF distortion aberration correction (S76).

The distortion aberration information obtaining device 230 determines whether the magnification of the OVF optical system has been changed, that is, the finder variable power lens 80 of FIG. 2 has been inserted into or removed from the OVF optical system (S77). When it is determined that the lens has been inserted into or removed from the OVF optical system, the procedure returns to step S71 for execution. When it is not determined that the lens has been inserted into or removed therefrom, step S78 is performed next.

At step S78, the correcting device 220 causes the image to be displayed on the LCD 40, and the CPU 12 causes the liquid-crystal shutter 82 to be in a non-transparent state and guides only the EVF image to the ocular lens 52 (S78).

As such, in the fourth embodiment of the present invention, when an event causing a change in distortion aberration of the OVF optical system occurs, the distortion aberration information obtaining device 230 re-obtains distortion aberration information after the change. Therefore, according to the change in distortion aberration, the EVF image with the same distortion aberration as that of the OVF image can always be displayed. Thus, while magnification change is exemplarily stated as an event which changes the distortion aberration information about the OVF optical system in FIG. 7, this is not meant to be restrictive, and all events which change the distortion aberration information about the OVF optical system such as lens zooming are included in the scope of the invention of the present application.

Fifth Embodiment

Next, a fifth embodiment of the present invention is described with reference to the drawings. The fifth embodiment of the present invention is mostly common to the first embodiment, and therefore description of common portions is omitted, and only different portions are described.

In the fifth embodiment of the present invention, when an OVF mode in which the OVF image is displayed on the ocular unit is forced to be switched to an EVF mode in which the EVF image is displayed on the ocular unit, the correcting device 220 corrects the EVF image so that the EVF image has the same distortion as that of the OVF image.

Figure 8:
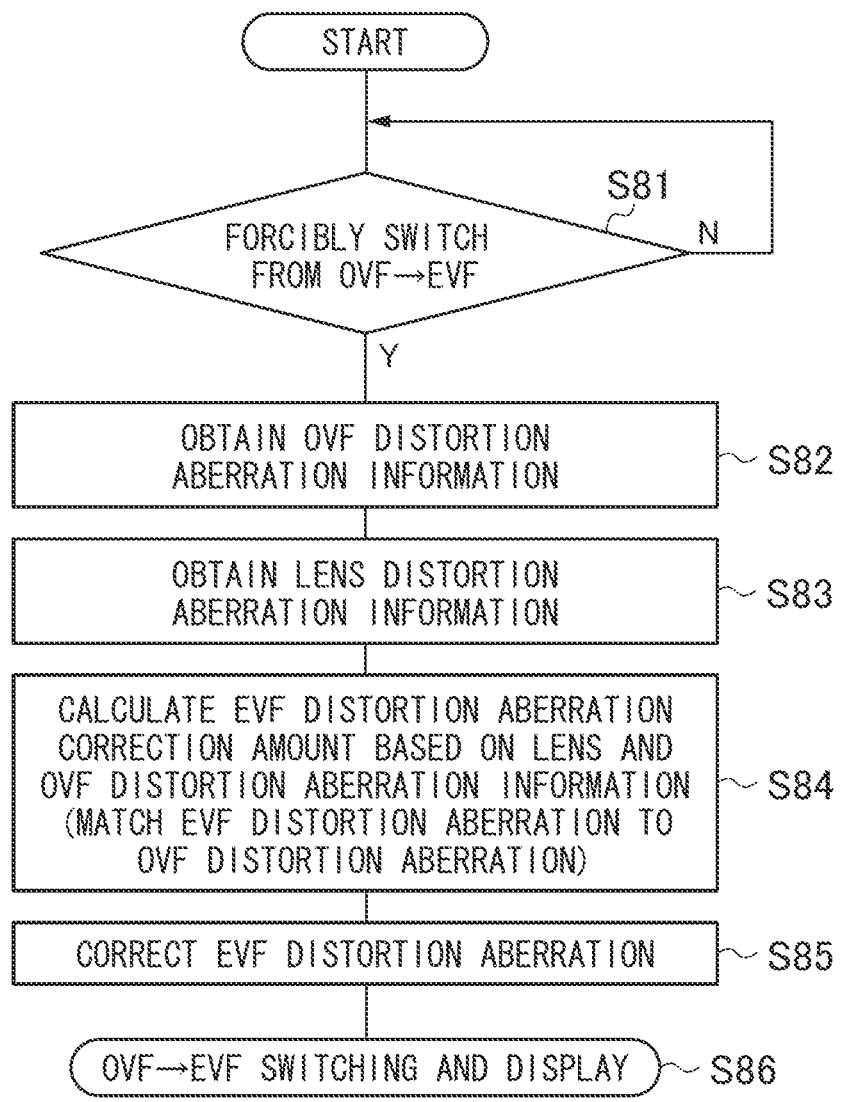
FIG. 8 is a flow diagram depicting an operation of a fifth embodiment.

Description is made with reference to FIG. 8. FIG. 8 is a flow diagram depicting an operation of the fifth embodiment. As depicted in FIG. 8, it is determined whether the OVF mode has been forced to be switched to the EVF mode. When it is determined that the mode has been forced to be switched, the next step S82 is performed. When it is not determined that the mode has been forced to be switched, this step S81 is continuously performed (S81). Here, a determination whether the mode has been forced to be switched is made by, for example, the CPU 12. Based on the determination, the CPU 12 can control operations of the distortion aberration information obtaining device 230 and the correcting device 220. However, the determination subject is not meant to be restricted to the CPU 12, and a determination may be made by the correcting device 220, the distortion aberration information obtaining device 230, or another component.

As such, the OVF mode is forced to be switched to the EVF mode when, for example, switching is made to the macro mode. As depicted in FIG. 2, in the case of an imaging device where a common portion is not present between the OVF optical system (the first optical system 200) and the EVF optical system (the second optical system 210) except the optical system from the beam splitter 54 to the ocular lens 52 (that is, in the case of an imaging device where parallax occurs between the OVF optical system and the EVF optical system), when the macro mode is selected, control for forcibly switching the OVF mode to the EVF mode may be performed in order to prevent the occurrence of parallax.

Referring back to FIG. 8, at step S81, when it is determined that the OVF mode is forced to be switched to the EVF mode, the distortion aberration information obtaining device 230 obtains a value of distortion aberration of the OVF (S82). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S83).

Next, at step S84, based on the distortion aberration information about the lens of the EVF optical system and the OVF optical system, the correcting device 220 calculates a distortion aberration correction amount of the EVF so that distortion of the EVF image is equal to distortion of the OVF image (S84). Based on the calculated correction amount, the correcting device 220 performs EVF distortion aberration correction (S85), and switches the EVF image to the OVF image for display (S86).

Sixth Embodiment

Next, a sixth embodiment of the present invention is described with reference to the drawings. The sixth embodiment of the present invention is mostly common to the first embodiment, and therefore description of common portions is omitted, and only different portions are described.

In the sixth embodiment of the present invention, distortion aberration correction is not performed in the case of a mode in which switching cannot be made between the OVF mode in which the OVF image is displayed on the ocular unit and the EVF mode in which the EVF image is displayed on the ocular unit. With this, correction is not made when switching between OVF/EVF cannot occur and the observer does not feel discomfort, and therefore load on the electronic circuits such as the correcting device 220 and the CPU 12 can be reduced, power consumption is suppressed, and battery life can be improved.

As such, an example of a mode in which switching cannot be made between the OVF mode and the EVF mode is the macro mode. In the case of the macro mode, the mode is normally fixed to the EVF mode, and setting is such that switching cannot be made to the OVF mode to prevent the occurrence of parallax. Here, in the present invention, the case of the mode in which switching cannot be made between the OVF mode and the EVF mode is not meant to be restricted to the macro mode. Also, the case in which switching cannot be made from the OVF mode to the EVF mode and the case in which switching cannot be made from the EVF mode to the OVF mode are both in the scope of the present invention.

Figure 9:
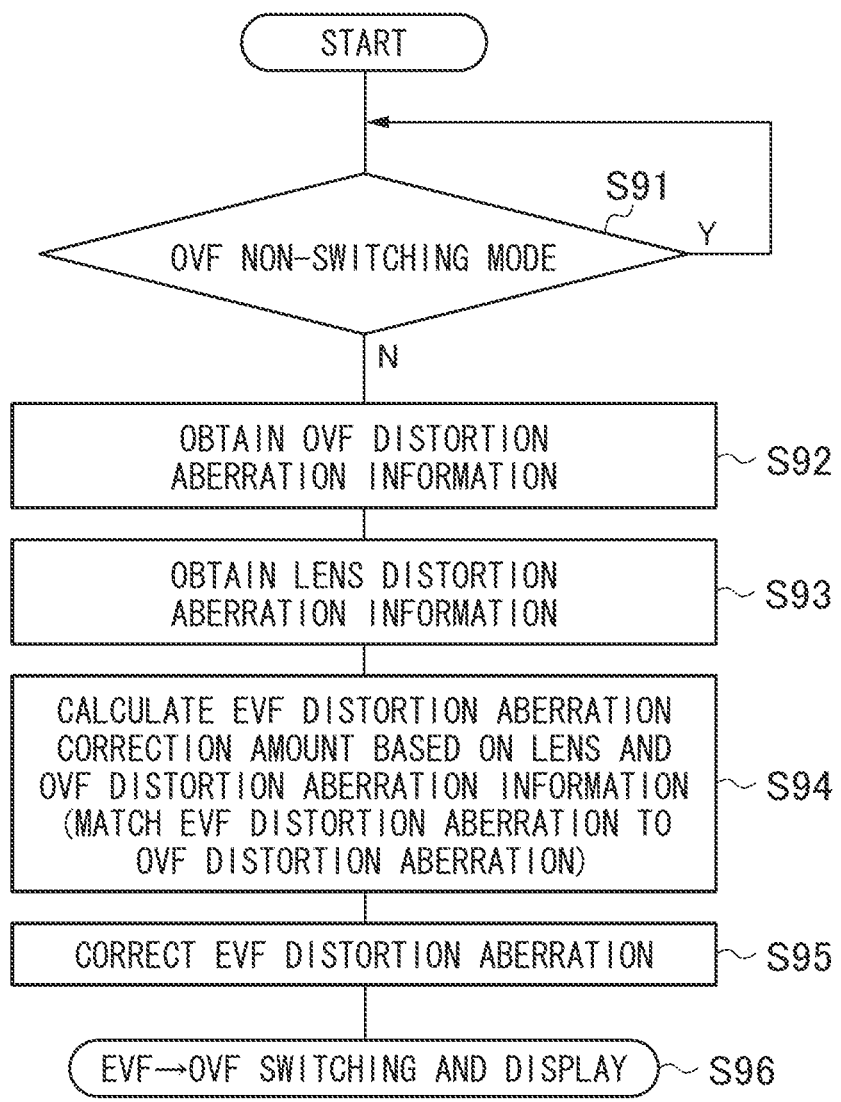
FIG. 9 is a flow diagram depicting an operation of a sixth embodiment.

Description is made with reference to FIG. 9. FIG. 9 is a flow diagram depicting an operation of the sixth embodiment. As depicted in FIG. 9, it is determined whether the mode is a "mode in which switching is not made" from the OVF mode to the EVF mode or from the EVF mode to the OVF mode or "not". When "not" is determined, the next S92 is performed. When the mode is a "mode in which switching is not made", this step S91 is continuously performed (S91). Here, a determination whether the mode is a "mode in which switching is not made" or "not" can be performed by, for example, the CPU 12. Based on the determination, the CPU 12 can control operations of the distortion aberration information obtaining device 230 and the correcting device 220. However, the determination subject is not meant to be restricted to the CPU 12, and a determination may be made by the correcting device 220, the distortion aberration information obtaining device 230, or another component.

At step S91, when it is determined that the mode is a "mode in which switching is not made", the distortion aberration information obtaining device 230 obtains a value of distortion aberration of the OVF (S92). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S93).

Next at step S94, based on the distortion aberration information about the lens of the EVF optical system and the OVF optical system, the correcting device 220 calculates a distortion aberration correction amount of the EVF so that distortion of the EVF image is equal to distortion of the OVF image (S94). Based on the calculated correction amount, the correcting device 220 performs EVF distortion aberration correction (S95), and switches the EVF image to the OVF image for display (S96).

Seventh Embodiment

Next, a seventh embodiment of the present invention is described with reference to the drawings. The seventh embodiment of the present invention is mostly common to the first embodiment, and therefore description of common portions is omitted, and only different portions are described.

In the seventh embodiment of the present invention, the OVF image and the EVF image are displayed on the ocular lens 52 as being superimposed with each other. Here, the EVF image is superimposed on the OVF image so as to have the same distortion aberration as that of the OVF image. Therefore, two images are completely superimposed with each other and become an image without discomfort.

Figure 10:
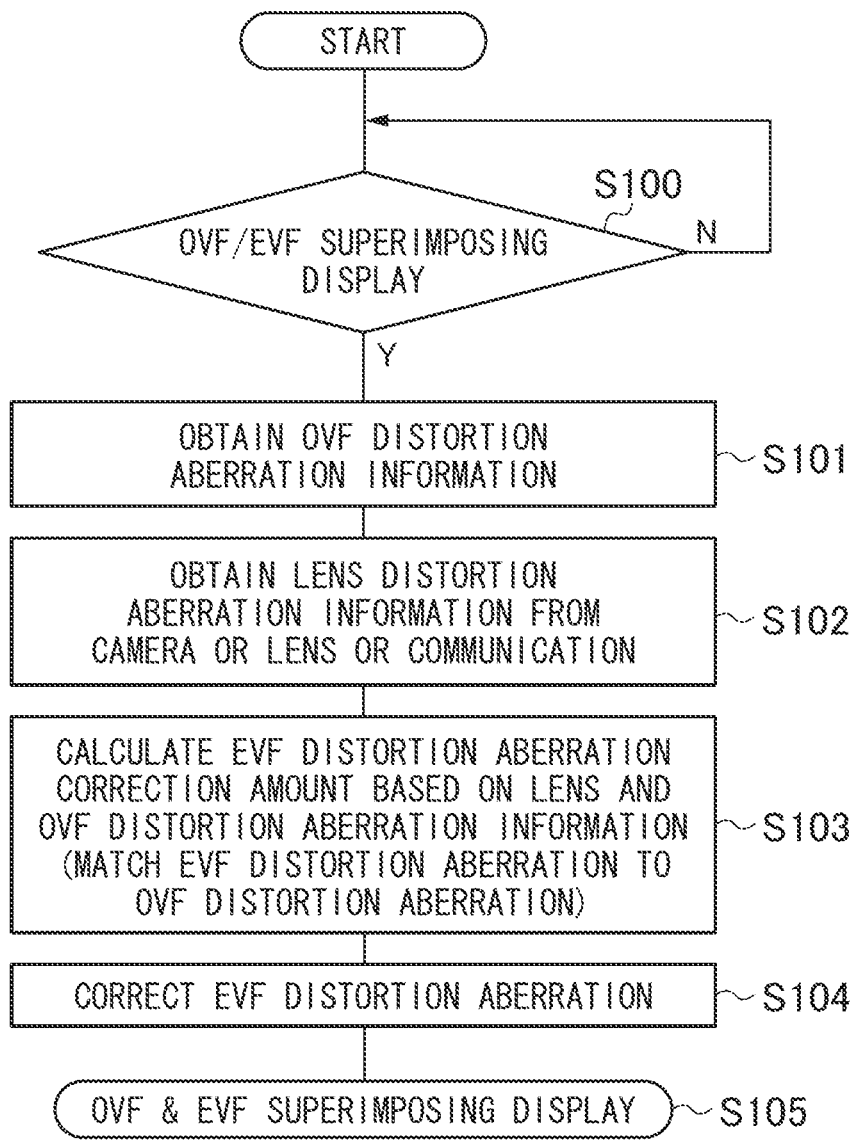
FIG. 10 is a flow diagram depicting an operation of a seventh embodiment.

Description is made with reference to FIG. 10. FIG. 10 is a flow diagram depicting an operation of the seventh embodiment. As depicted in FIG. 10, it is determined whether the mode is a "mode for superimposing display" of the OVF image and the EVF image or "not". When the mode is a "mode for superimposing display", the next step S101 is performed. When "not" is determined, this step S100 is continuously performed (S100). Here, a determination whether the mode is a "mode for superimposing display" or "not" can be made by, for example, the CPU 12. Based on the determination, the CPU 12 can control operations of the distortion aberration information obtaining device 230 and the correcting device 220. However, the determination subject is not meant to be restricted to the CPU 12, and a determination may be made by the correcting device 220, the distortion aberration information obtaining device, or another component.

When it is determined at step S100 that the mode is a "mode for superimposing display", the distortion aberration information obtaining device 230 obtains a value of distortion aberration of the OVF (S101). In this obtainment of distortion aberration information, distortion aberration may be obtained from the storage device of the imaging device body or may be obtained from outside of the imaging device body.

The distortion aberration information obtaining device 230 obtains a value of distortion aberration of the lens of the EVF optical system from the camera as the imaging device body or the storage device provided to the imaging lens of the imaging optical system 16 or through communication (wired or wireless) (S102).

Next at step S94, based on the distortion aberration information about the lens of the EVF optical system and the OVF optical system, the correcting device 220 calculates a distortion aberration correction amount of the EVF so that distortion of the EVF image is equal to distortion of the OVF image (S103). Based on the calculated correction amount, the correcting device 220 performs EVF distortion aberration correction (S104), and performs superimposing display of the EVF image and the OVF image (S105).

What is claimed is:

1. An imaging device comprising:
a first optical system formed by combining an optical system from an imaging lens to an image pickup element where a subject image is formed and an optical system from a display device where an electronic image of a subject representing an image formed at the image pickup element is displayed to an ocular unit of a finder, wherein the finder is a hybrid finder allowing optical image display, electronic image display, and superimposing display of optical and electronic images;
a second optical system which guides an optical image of the subject to the ocular unit, wherein the optical image is guided to the ocular unit without passing through the optical system from the imaging lens, through the image pickup element, to the display device; and
a correcting device which performs, based on distortion aberration information about the first optical system and distortion aberration about the second optical system, distortion aberration correction to the electronic image of the subject so that distortion aberration equal to distortion aberration of the optical image of the subject occurs in the electronic image of the subject and causes the electronic image to be displayed on the display device.

2. The imaging device according to claim 1, wherein the correcting device calculates an absolute value $\alpha$ of a difference between the distortion aberration about the first optical system and the distortion aberration about the second optical system, and does not perform the distortion aberration correction when $\alpha$ is equal to a threshold set in advance or less and performs the distortion aberration correction when $\alpha$ is larger than the threshold.

3. The imaging device according to claim 1, wherein the imaging lens is replaceable,
the device further comprises a distortion aberration information obtaining device which obtains distortion aberration information about at least one of the first optical system and the second optical system, and
the distortion aberration information obtaining device obtains the distortion aberration information about at least one of the first optical system and the second optical system from a storage device provided to the imaging lens or the storage device provided to a body of the imaging device or outside the body of the imaging device via wired or wireless communication.

4. The imaging device according to claim 2, wherein the imaging lens is replaceable,
the device further comprises a distortion aberration information obtaining device which obtains distortion aberration information about at least one of the first optical system and the second optical system, and
the distortion aberration information obtaining device obtains the distortion aberration information about at least one of the first optical system and the second optical system from a storage device provided to the imaging lens or the storage device provided to a body of the imaging device or outside the body of the imaging device via wired or wireless communication.

5. The imaging device according to claim 1, further comprising a distortion aberration information obtaining device which obtains distortion aberration information about at least one of the first optical system and the second optical system,
in the first optical system, with the lens replaced or with lens zooming done, the distortion aberration information obtaining device re-obtains distortion aberration information about the first optical system and, in the second optical system, with the lens added or removed or with lens zooming done, the distortion aberration information obtaining device re-obtains distortion aberration information about the second optical system, and
the correcting device performs the distortion aberration correction based on the re-obtained distortion aberration information.

6. The imaging device according to claim 2, further comprising a distortion aberration information obtaining device which obtains distortion aberration information about at least one of the first optical system and the second optical system,
  in the first optical system, with the lens replaced or with lens zooming done, the distortion aberration information obtaining device re-obtains distortion aberration information about the first optical system and, in the second optical system, with the lens added or removed or with lens zooming done, the distortion aberration information obtaining device re-obtains distortion aberration information about the second optical system, and
  the correcting device performs the distortion aberration correction based on the re-obtained distortion aberration information.

7. The imaging device according to claim 3, further comprising a distortion aberration information obtaining device which obtains distortion aberration information about at least one of the first optical system and the second optical system,
  in the first optical system, with the lens replaced or with lens zooming done, the distortion aberration information obtaining device re-obtains distortion aberration information about the first optical system and, in the second optical system, with the lens added or removed or with lens zooming done, the distortion aberration information obtaining device re-obtains distortion aberration information about the second optical system, and
  the correcting device performs the distortion aberration correction based on the re-obtained distortion aberration information.

8. The imaging device according to claim 4, further comprising a distortion aberration information obtaining device which obtains distortion aberration information about at least one of the first optical system and the second optical system,
  in the first optical system, with the lens replaced or with lens zooming done, the distortion aberration information obtaining device re-obtains distortion aberration information about the first optical system and, in the second optical system, with the lens added or removed or with lens zooming done, the distortion aberration information obtaining device re-obtains distortion aberration information about the second optical system, and
  the correcting device performs the distortion aberration correction based on the re-obtained distortion aberration information.

9. The imaging device according to claim 1, wherein
  the correcting device performs the distortion aberration correction, with a mode of displaying the optical image from the second optical system on the ocular unit being switched to a mode of displaying the electronic image from the first optical system.

10. The imaging device according to claim 2, wherein
  the correcting device performs the distortion aberration correction, with a mode of displaying the optical image from the second optical system on the ocular unit being switched to a mode of displaying the electronic image from the first optical system.

11. The imaging device according to claim 3, wherein
  the correcting device performs the distortion aberration correction, with a mode of displaying the optical image from the second optical system on the ocular unit being switched to a mode of displaying the electronic image from the first optical system.

12. The imaging device according to claim 4, wherein
  the correcting device performs the distortion aberration correction, with a mode of displaying the optical image from the second optical system on the ocular unit being switched to a mode of displaying the electronic image from the first optical system.

13. The imaging device according to claim 1, wherein
  the correcting device does not perform the distortion aberration correction in a state of a fixed mode where a mode of displaying the electronic image from the first optical system on the ocular unit is not switched to a mode of displaying the optical image from the second optical system, and performs the distortion aberration correction with the fixed mode released.

14. The imaging device according to claim 2, wherein
  the correcting device does not perform the distortion aberration correction in a state of a fixed mode where a mode of displaying the electronic image from the first optical system on the ocular unit is not switched to a mode of displaying the optical image from the second optical system, and performs the distortion aberration correction with the fixed mode released.

15. The imaging device according to claim 3, wherein
  the correcting device does not perform the distortion aberration correction in a state of a fixed mode where a mode of displaying the electronic image from the first optical system on the ocular unit is not switched to a mode of displaying the optical image from the second optical system, and performs the distortion aberration correction with the fixed mode released.

16. The imaging device according to claim 4, wherein
  the correcting device does not perform the distortion aberration correction in a state of a fixed mode where a mode of displaying the electronic image from the first optical system on the ocular unit is not switched to a mode of displaying the optical image from the second optical system, and performs the distortion aberration correction with the fixed mode released.

17. The imaging device according to claim 1, wherein
  the correcting device does not perform the distortion aberration correction in a state of not being in a superimposing display mode where the electronic image from the first optical system and the optical image from the second optical system are displayed in a superimposing manner on the ocular unit, and performs the distortion aberration correction in the superimposing display mode.

18. The imaging device according to claim 2, wherein
  the correcting device does not perform the distortion aberration correction in a state of not being in a superimposing display mode where the electronic image from the first optical system and the optical image from the second optical system are displayed in a superimposing manner on the ocular unit, and performs the distortion aberration correction in the superimposing display mode.

19. The imaging device according to claim 3, wherein
  the correcting device does not perform the distortion aberration correction in a state of not being in a superimposing display mode where the electronic image from the first optical system and the optical image from the second optical system are displayed in a superimposing manner on the ocular unit, and performs the distortion aberration correction in the superimposing display mode.

20. An imaging device comprising:
  a first optical system formed by combining an optical system from an imaging lens to an image pickup element where a subject image is formed and an optical system from a display device where an electronic image of a subject representing an image formed at the image pickup element is displayed to an ocular unit of a finder, wherein the finder is a hybrid finder allowing optical image display, electronic image display, and superimposing display of optical and electronic images;

a second optical system which guides an optical image of the subject to the ocular unit, wherein the optical image is guided to the ocular unit without passing through the optical system from the imaging lens, through the image pickup element, to the display device; and a correcting device which performs, based on distortion aberration information about the first optical system and distortion aberration about the second optical system, distortion aberration correction to the electronic image of the subject so that distortion aberration equal to distortion aberration of the optical image of the subject occurs in the electronic image of the subject and causes the electronic image to be displayed on the display device, wherein the correction device performs the distortion aberration and causes the electronic image after the distortion aberration correction to be displayed on the display device so that the distortion aberration of the electronic image and the distortion aberration of the optical image coincide with each other in superimposing display.

21. The imaging device according to claim 1, wherein the correcting device performs the distortion aberration correction upon switching an image to be viewed through the ocular unit from the optical image to the electronic image, and switches the optical image to the electronic image after the distortion aberration.

* * * * *